June 27, 1967   F. J. McCABE   3,327,764
DAMPER AND METHOD OF MAKING SAME
Filed Jan. 18, 1965   6 Sheets-Sheet 1
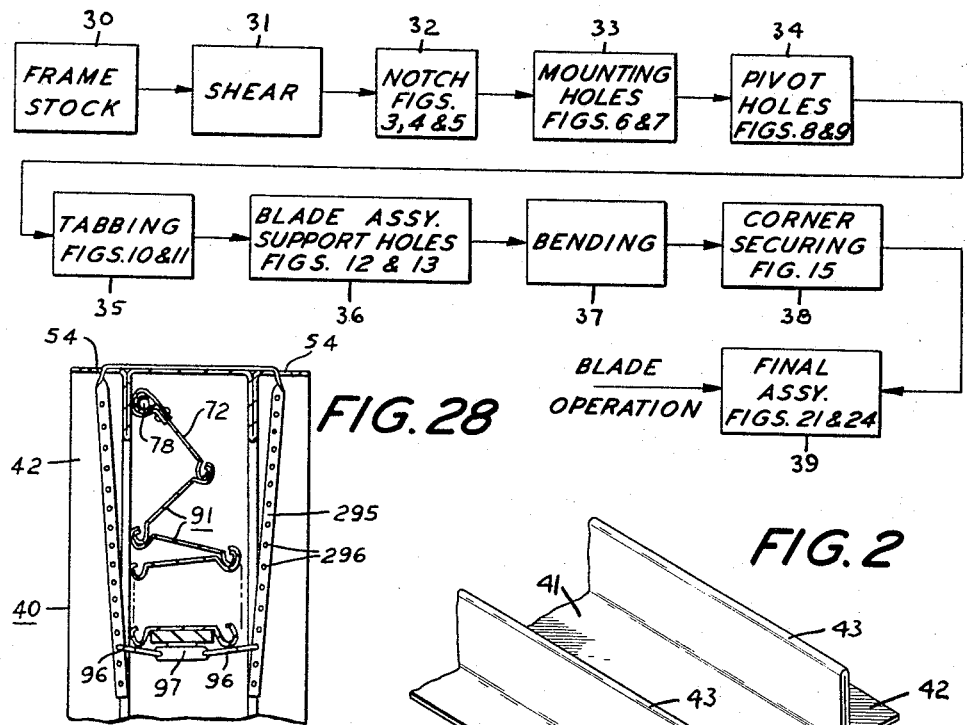
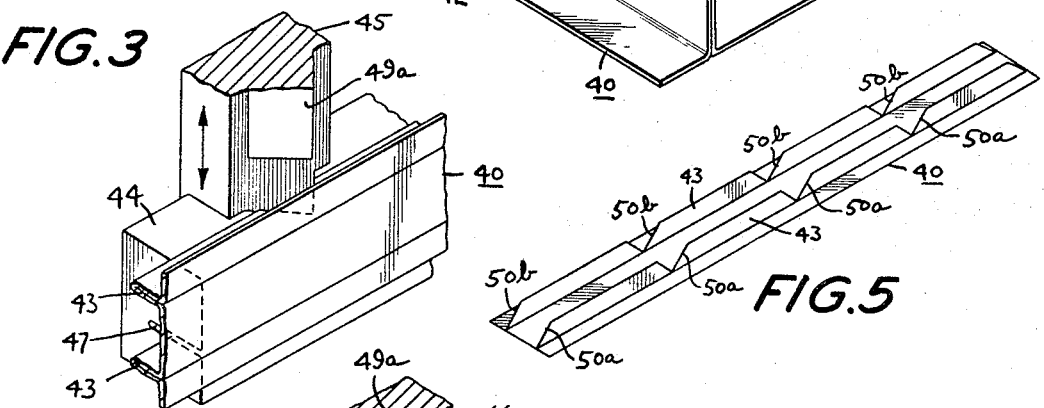
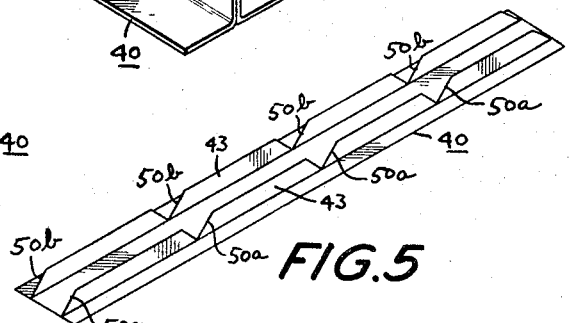
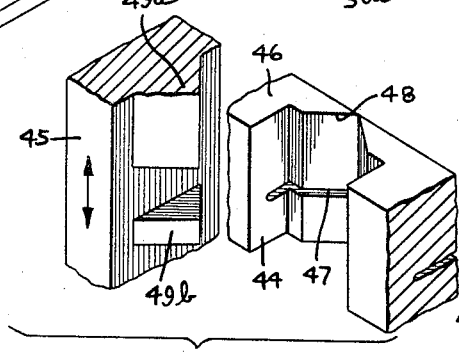
INVENTOR
FRANCIS J. McCABE
BY
Walter B. Udell
ATTORNEY June 27, 1967  F. J. McCABE  3,327,764
DAMPER AND METHOD OF MAKING SAME
Filed Jan. 18, 1965  6 Sheets-Sheet 2
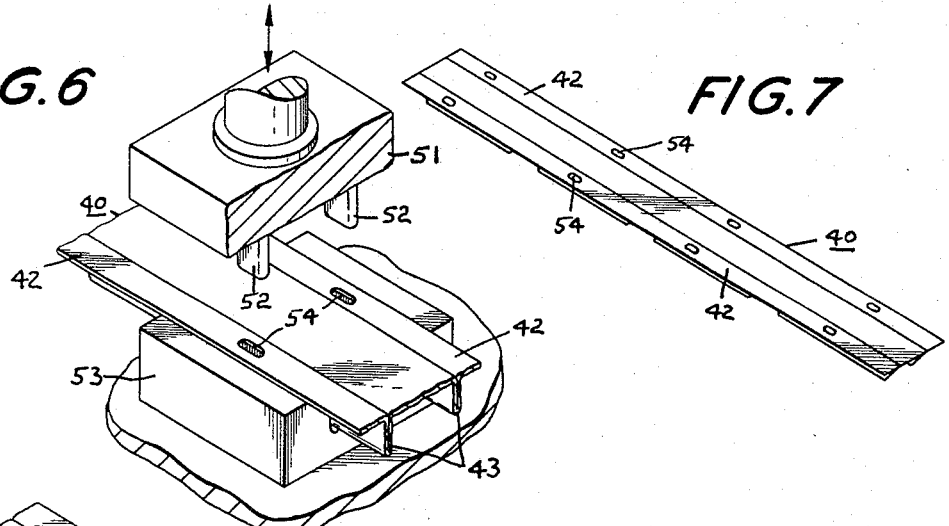
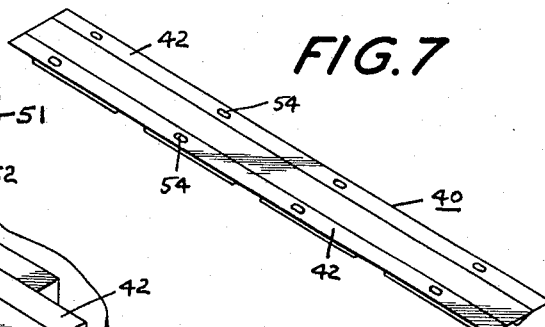
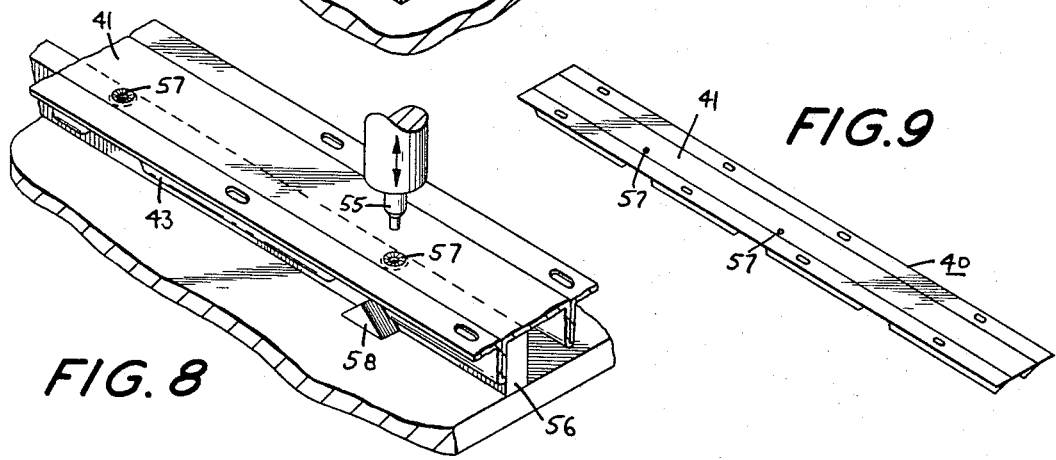
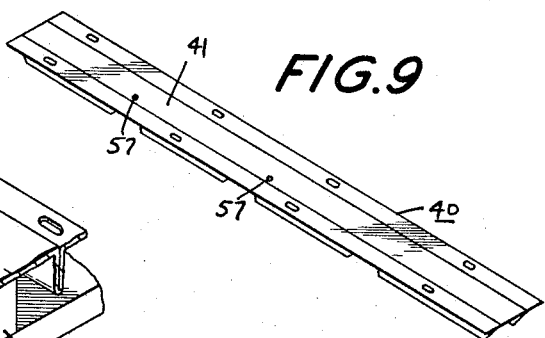
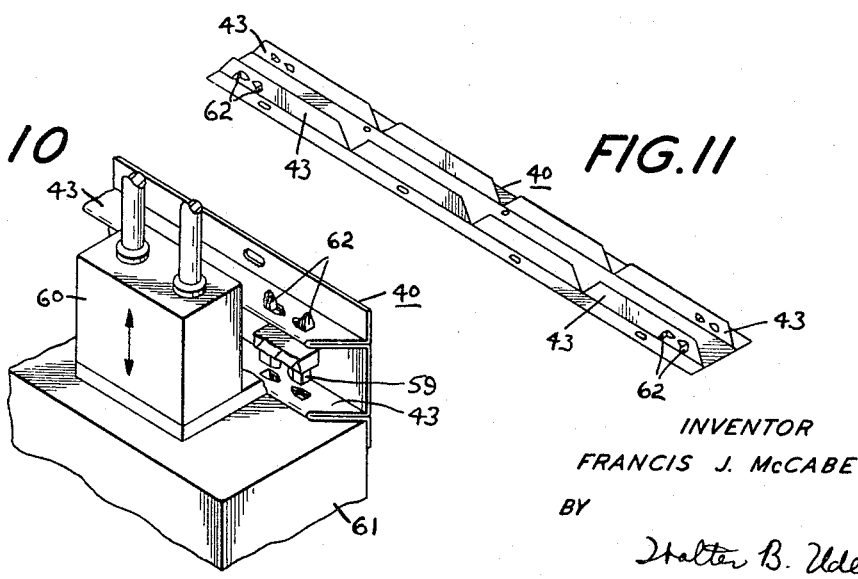
INVENTOR
FRANCIS J. McCABE
BY
Walter B. Udell
ATTORNEY

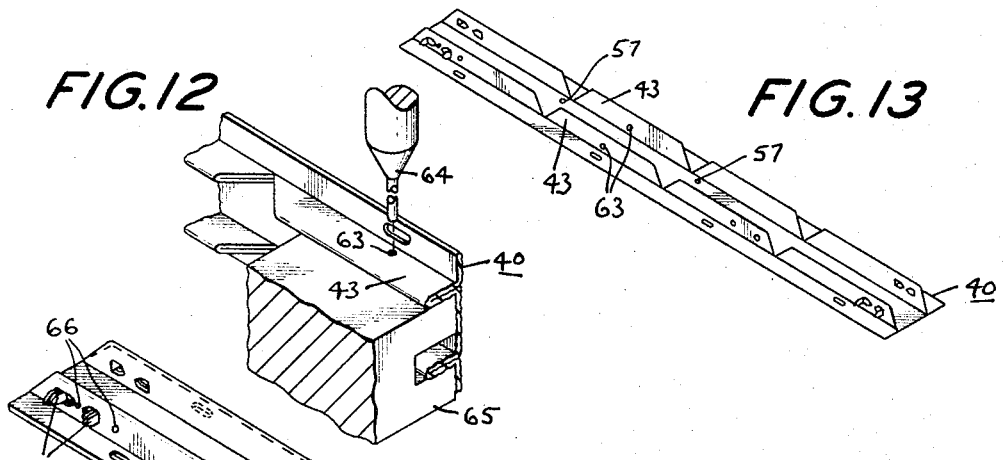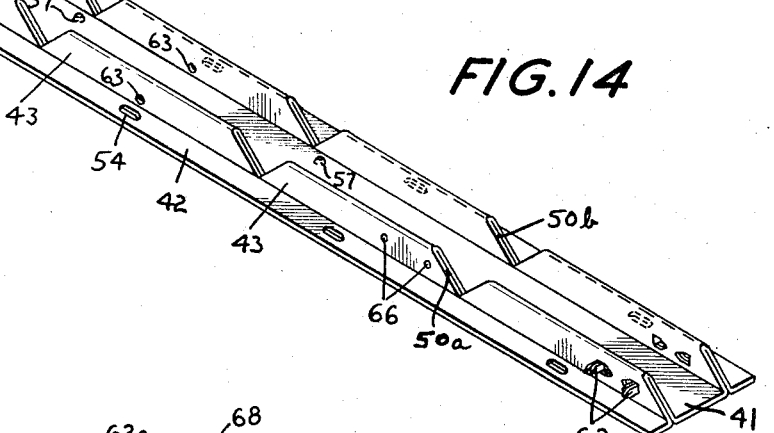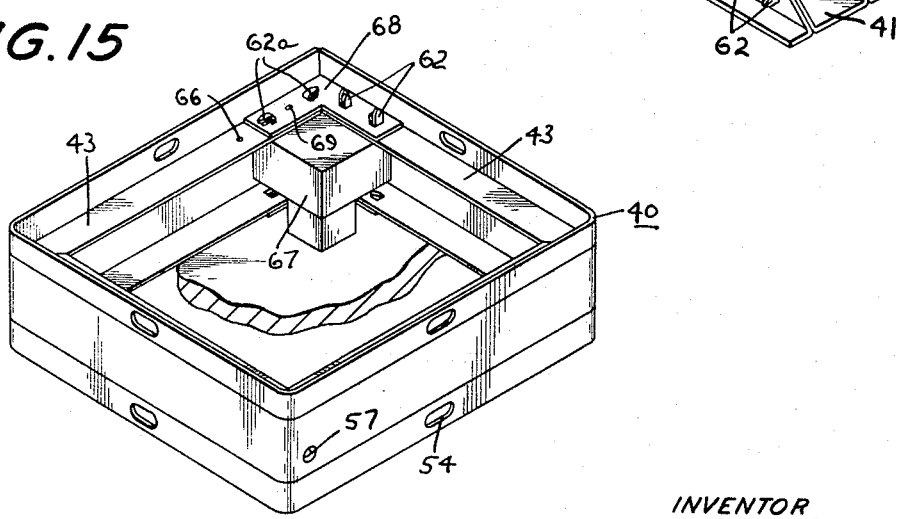

June 27, 1967 F. J. McCABE 3,327,764
DAMPER AND METHOD OF MAKING SAME
Filed Jan. 18, 1965 6 Sheets-Sheet 4
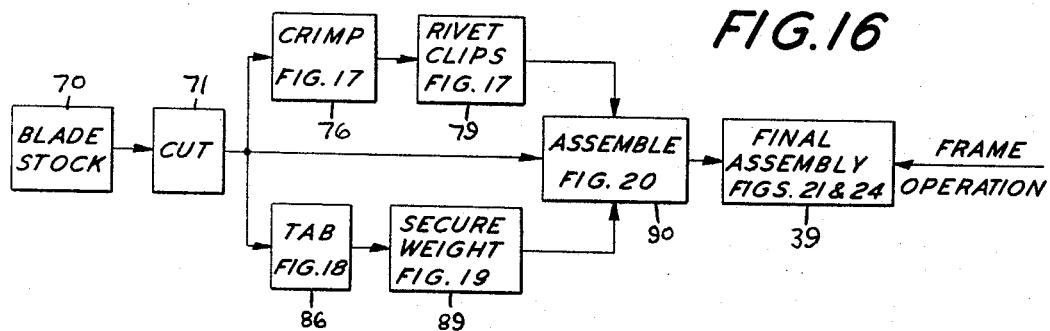
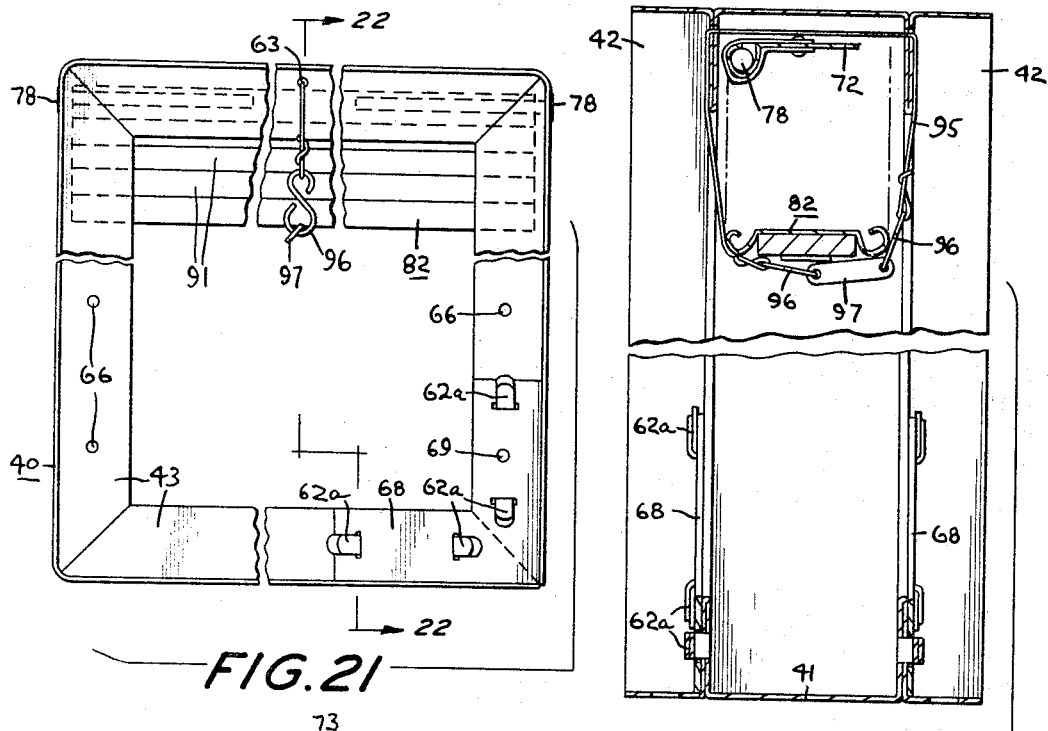
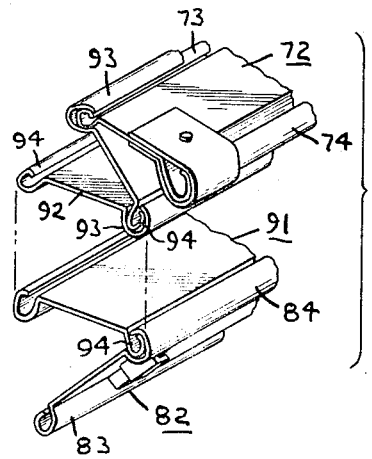
INVENTOR
FRANCIS J. McCABE
BY
Walter B. Udell
ATTORNEY June 27, 1967     F. J. McCABE     3,327,764
DAMPER AND METHOD OF MAKING SAME
Filed Jan. 18, 1965     6 Sheets-Sheet 5
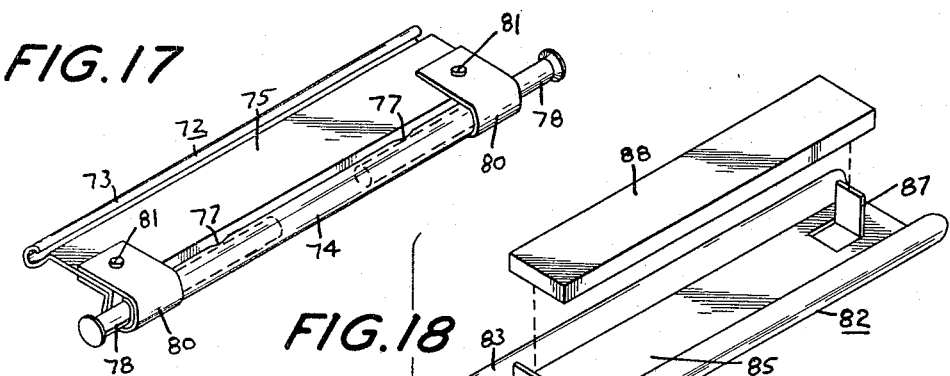
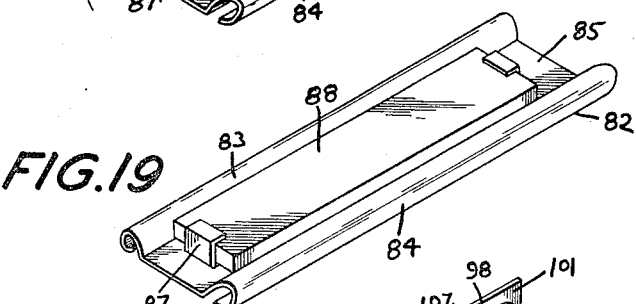
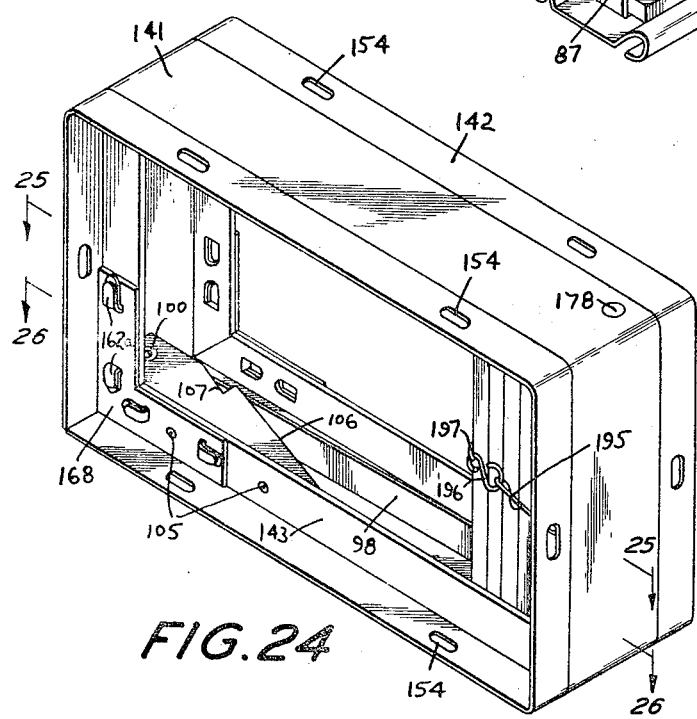
INVENTOR
FRANCIS J. McCABE
BY
Walter B. Udell
ATTORNEY INVENTOR
FRANCIS J. McCABE
BY
Walter B. Udell
ATTORNEY

United States Patent Office 3,327,764
Patented June 27, 1967

3,327,764
DAMPER AND METHOD OF MAKING SAME
Francis J. McCabe, Penns Park, Pa., assignor to Air Balance, Inc., Philadelphia, Pa., a corporation of Pennsylvania
Filed Jan. 18, 1965, Ser. No. 426,183
14 Claims. (Cl. 160—5)

This invention relates generally to damper structures and the method of making the same, and more particularly relates to a novel one piece perimeter frame for damper structures which typically could find utilization in a fire damper device employing a stack of reversely folded continuous interlocked blades of the type fully illustrated and described in my copending patent application Ser. No. 375,855, filed June 17, 1964. This type of blade structure is shown for illustrative purposes in several figures of the drawings hereinafter to be described.

In the past, the frames for damper structures have been constructed from a plurality of straight sections cut to size and normally intersecured at the corners, as by welding or bolting, to form generally rectangular frames. This type of assembly usually requires jigging to hold the parts in proper relative position while frame assembly is being carried out. The cutting to size, jigging and assembly operations associated with the frame structures entail a considerable amount of time so that the labor charge associated with frame construction represents an appreciable cost factor in the production of the finished product. Accordingly, it is a principal object of my invention to provide a novel one piece perimeter frame for a damper structure in which all of the cutting and forming operations required to provide a finished frame are carried out on a piece of frame stock while it is a single straight piece of material which is thereafter bent into its final rectangular configuration and locked up.

Another object of my invention is to provide a novel one piece perimeter damper frame as aforesaid which requires no welding or bolts in its construction.

A further object of my invention is to provide a novel method for making the novel damper frame which results in a high rate of production, a sharp reduction in the labor costs associated with production of such a frame and other manufacturing economies resulting in part from a substantially reduced rejection rate.

Still another object of my invention is to provide a novel damper frame as aforesaid which in one form is usable directly as a vertical drop curtain frame, and which may be simply adapted for use as a horizontal mounting frame.

The foregoing and other objects of my invention will appear more fully hereinafter from a reading of the following specification in conjunction with an examination of the appended drawings, wherein:

FIGURE 1 is a flow diagram illustrating the sequence of operations carried out upon the framing stock to produce a completed frame ready for final assembly with a blade stack;

FIGURES 2 through 15 illustrate the frame stock and the tools operating thereon which carry out the steps shown in the flow diagram of FIGURE 1, the transformation of the frame stock being shown in sequential FIGURES 2, 5, 7, 9, 11, 13 and 15 whereas, illustrative showings of the forming tools in operation is seen in FIGURES 3 and 4, 6, 8, 10 and 12;

FIGURE 16 is a flow diagram which illustrates the conversion of blade stock into a complete blade assembly ready for combination with the assembly frame into a finished damper unit;

FIGURES 17 through 20 illustrate the successive steps in fabrication of a completed blade assembly;

FIGURE 21 illustrates a complete damper assembly including a blade assembly installed within a completed frame, the illustrated damper being one designed for a vertical mounting as shown;

FIGURE 22 is a vertical sectional view taken through the damper structure of FIGURE 21 as would be seen when viewed along the line 22—22 thereof;

FIGURE 23 is a perspective view of a lock guide physically securable to a damper frame structure for use when the latter is intended for installation as a horizontally operated damper;

FIGURE 24 is a perspective view of a horizontal mount damper structure according to the invention utilizing the novel frame structure and the lock guides shown in FIGURE 23;

FIGURE 28 is a vertical sectional view corresponding to FIGURE 22 but modified to provide adjustable position blade assembly securing means.

In the several figures, like elements are denoted by like reference characters.

Figure 26:
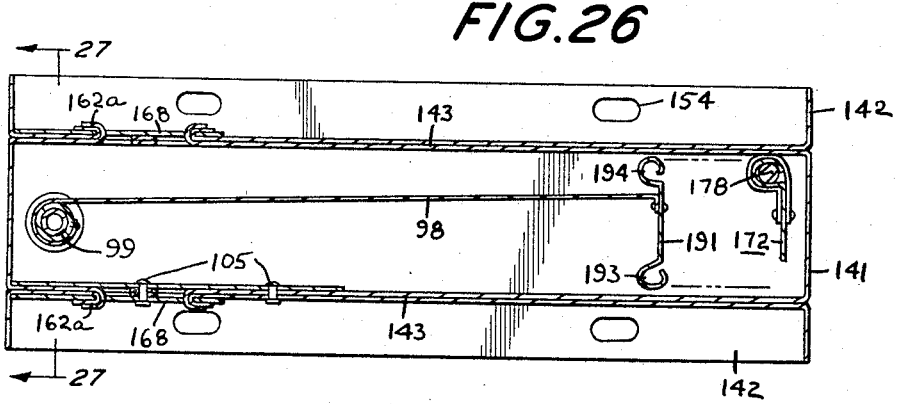
FIGURE 26 is a sectional view through the damper structure of FIGURE 24 taken at a different elevation than that of FIGURE 25 and illustrating the blade assembly in compacted form with the cross section of the damper frame being open for air passage therethrough.

Turning first to a consideration of FIGURE 1, the method of making the novel frame structure according to the invention is illustrated by the flow diagram sequence designated by the fabrication blocks 30 through 39 which designate the operations carried out upon the frame stock 40 illustrated in FIGURE 2. As best seen in FIGURE 2, the frame stock 40 includes a main planar central web 41 disposed between longitudinally parallel extending opposite side margins 42 coplanar with the central web 41, and a pair of longitudinally extending spaced apart parallel upstanding flanges 43 disposed between and orthogonally to the central web and side margins. As shown in FIGURE 2, the framing stock 40 is formed from rectangular sheet material, which may typically be of galvanized steel and which has been bent or die formed to produce the upstanding flanges 43. Alternatively, the frame stock 40 of cross section as illustrated in FIGURE 2 could be formed by extrusion.

Returning now to FIGURE 1, the block 30 designated as frame stock represents either a supply of frame stock material of the type shown in FIGURE 2 or a forming station where the frame stock is produced on a continuous basis and routed to a shearing station designated as 31 where a predetermined length of the stock is cut off, the cut length corresponding to that required to form a frame of predetermined peripheral length as a finished unit. From the shearing station, the frame stock is routed to a notching station, designated as 32, where the flanges 43 are notched as shown in FIGURES 3, 4 and 5. From the notching station 32 the stock proceeds to station 33 where the mounting holes are punched through the side margins as illustrated in FIGURES 6 and 7. Thereafter, the blade assembly pivot holes are punched in the central web at station 34 illustrated in FIGURES 8 and 9. The tabbing operation 35 is shown in FIGURES 10 and 11 while the blade assembly support holes designated by block 36 are thereafter formed as shown in FIGURES 12 and 13. The completely cut and punched frame stock shown in FIGURE 14 is then bent into closed form and corner secured as indicated by flow diagram blocks 37 and 38 in FIGURE 15. The finished frame assembly is then routed to the final assembly station 39 where the preformed blade assembly is installed as subsequently to be described.

Referring now to FIGURES 3 and 4 there is seen the notching die 44 and its cooperating vertically reciprocable punch head 45. The die 44 is provided with a horizontal support bed 46 and a downwardly spaced horizontally extending slot 47 spaced below the bed 46 by a distance equal to the separation between the upstanding flanges 43 of frame stock 40 so that one flange may be disposed within the slot while the other flange overlies and seats downward upon the bed 46. The die 44 is provided with a right angled recess 48 extending symmetrically rearward from its front face, while the punch 45 is provided with upper and lower punches 49a and 49b respectively, complementary shaped to the recess 48. With the frame stock 40 disposed within the notching device as shown in FIGURE 3, the punches may be vertically downwardly driven to simultaneously notch out the upstanding flanges 43 as shown at 50a and 50b in the showing of FIGURE 5. As also seen in FIGURE 5, the ends of the frame stock strip are half notched to provide for their right angled abutment when the frame stock is formed into its closed rectangular form. The three intermediate full notchings are spaced in accordance with the respective dimensions of the frame to be formed, in the illustrated case the notchings being equally spaced to provide a completed frame of square shape as is seen in FIGURE 15.

Referring now to FIGURES 6 and 7 which illustrate the punching of the frame mounting holes, in FIGURE 6 there is seen a punch head 51 from the underside of which downwardly depend a pair of spaced apart punches 52 of generally oval or elongated cross section, the punches being laterally spaced a distance somewhat in excess of the spacing between the upstanding flanges 43 of the frame stock 40 so that the mounting holes to be punched are positioned in the side margin parts 42. Disposed immediately beneath the punch head 51 is a die 53 having a pair of recesses shaped complementally to the punches 52 for receiving the same when the punch head is vertically downwardly shifted. The frame stock 40 is inverted so that the flanges 43 are dependent and disposed within vertical slots formed in the die 53 to provide for flatwise downward seating of the side margins 42 upon the upper surface of the die preparatory to punching. The punch head 51 is then vertically downwardly driven to punch a pair of holes 54 in side margins 42 as shown. As shown in FIGURE 7, a plurality of sets of mounting holes 54 are punched through the frame stock side margins 42 with at least one set being provided for each interval which will form one side of the finished frame. Larger frames may of course be provided with several sets of mounting holes for each frame side as desired.

FIGURE 8 illustrates the punching of the blade assembly pivot pin holes by a punch and countersink 55 cooperating with an underlying die 56 to form the countersunk pivot holes 57. From the showing of assembled FIGURE 21 it is observed that the pivot pins which mount the blade assembly in the frame are projected inward through the frame sides proximate the upper ends thereof and it will be appreciated that these pivot holes are positioned on opposite sides of the pair of notches which define the frame corner locations. This asymmetric positioning of the pivot holes requires an asymmetric indexing device which is provided by the triangular index block 58. As shown in FIGURE 8, the near edge of one of the notches is abutted against the near face of the index block 58 to properly locate one of the pivot holes 57. The remotely located pivot hole 57 previously punched was properly located by abutment of the far edge of its proximate flange notch against the far surface of the index block 58. The section of the frame stock 40 between the two countersunk pivot holes 57, as best seen in FIGURE 9, is the portion which will constitute the frame top run in a completely assembled unit intended for vertical operation of the blade curtain, but could constitute any one of the sides in a completed assembly intended for horizontal actuation of the blade assembly.

FIGURE 10 illustrates the tabbing operation, while FIGURE 11 illustrates the frame stock after it has been completely tabbed. As seen in FIGURE 10, the tabbing punches 59 are carried by a vertically reciprocable punch-head 60 operative to drive the punches 59 downward through a flange 43 of the frame stock 40 into the tabbing die 61 to form a pair of outwardly turned tabs 62 projecting in parallel relationship to one another and at right angles to the frame stock flanges 43. As best seen in FIGURE 11, the tabs 62 are turned outward from each of the end section flanges 43 proximate to the outer ends thereof so as to provide four sets of tabs 62.

FIGURES 12 and 13 illustrate the formation of the blade assembly support holes 63 which are punched through the opposite flanges 43 of the frame stock which lie between the pivot holes 57, the holes 63 being formed by punch 64 cooperating with die 65 which latter supports the flanges 43 of the frame stock. The holes 63 may be punched individually through each of the flanges 43, or may be punched simultaneously as shown in FIGURE 12 by utilizing a long stroke punch with a double die. Other arrangements are of course also possible, as for example utilization of a pair of punches 64 disposed respectively outwardly of the pair of flanges 43 and being drivable inward toward one another to punch both flanges. A completely punched piece of frame stock is shown in FIGURE 14, such showing also including the two sets of holes 66 punched through the near upstanding flange 43. These holes 66 are only utilized in a damper structure intended for horizontal actuation of the damper blade assembly and may be punched as a matter of course, or only in those frames which are specifically intended for horizontal damper use, as desired.

The completely punched piece of frame stock 40 is now bent at the notches 50A and 50B along lines extending transversely across the central web 41 and side margins 42 to bring the edges of each notch into abutment with one another and to bring the notched surfaces at the opposite ends of the punched frame also into abutment to form the generally square frame illustrated in the showing of FIGURE 15. The abutting terminal ends of the folded frame stock are positioned with the upper flanges 43 disposed flatwise upon an anvil 67, and an L-shaped corner plate 68 having slots therein corresponding to the positions of the vertically upstanding tabs 62 is projected downward onto the outside surfaces of the flanges 43 so that the tabs 62 project upward therethrough. All four tabs 62 are then hammered or pressed outward and downward, as shown at 62a in FIGURE 15, to form a rigid corner securement. The frame is then turned top for bottom and a second corner plate 68 is applied to the opposite tabbed flanges 43. The corner plates 68 are provided with a hole 69 in one leg thereof so positioned that it directly overlies and registers with the hole 66 between the tabs 62. The completed frame is now ready to have a blade assembly installed therein to provide a finished damper.

Fabrication of the blade assembly is illustrated in the flow diagram of FIGURE 16, and in detailed diagrams 17 through 20 which illustrate specific steps in the fabrication of a completed blade assembly. From FIGURE 16 it is observed that the blade stock designated by box 70 is first cut to length as at 71, all of the blades which are to form the assembly being cut to the same length. The blade assembly includes three different types of blade elements, a top blade, a bottom blade and the intermediate blades forming the major part of the curtain.

The top blade is illustrated in FIGURE 17, is designated generally as 72 and includes an inside hinging edge 73, an outside hinging edge 74 parallel to the inside hinging edge, and a web 75 extending between and connecting the hinging edges 73 and 74. The top blade is routed to a crimping station 76 where the crimps or depressions 77 are pressed into the outside hinging edge 74 so that the pivot pins 78 which are otherwise freely longitudinally endwise projectable into the outside hinging edge 74 must be tapped or driven past the crimps or depressions 77 when the blade assembly is installed into the completed frame, as seen for example in the showing of FIGURE 21. This frictional engagement of the pivot pins 78 with the hinging edge 74 of the top blade retains the pivot pins in position in the finishing unit. The crimped top blade 72 is then routed to riveting station 79 where the conforming clips 80 are wrapped about the ends of the outside hinging edge 74 of the top blade, and are secured fixedly in position by rivets 81.

The bottom blade of the assembly illustrated in FIGURES 18 and 19 and designated generally as 82 also includes an inside hinging edge 83, an outside hinging edge 84 and a central web 85. The bottom blade 82 is first routed to a tabbing station 86 where a pair of tabs 87 are turned upward out of the central web 85 so that a bar weight 88 may be seated flatwise down upon the central web and be secured fixedly thereto as at station 89 by turning the tabs 87 inward over the top of the weight in the manner best seen in FIGURE 19.

The top blade 72, bottom blade 82 and the plurality of intermediate blades 91 are formed into a complete blade assembly at the assembly station 90, the intermediate blades 91 each having a central web 92 and outside and inside hinging edges 93 and 94 respectively. As best seen in FIGURE 20, the inside hinging edges 94 of the intermediate blades 91 are slid endwise into the outside hinging edges 93 of the next adjacent blades of the intermediate group, the inside hinging edge 73 of the top blade 72 is slid endwise into the outside hinging edge 93 of the below lying intermediate blade, and the inside hinging edge 94 of the lowermost intermediate blade 91 is slid endwise into the outside hinging edge 84 of the bottom blade 82. The blade assembly is compacted by reversely folding the blades against one another as seen for example in FIGURE 21, is inserted into the completed frame between the frame flanges 43, and the pivot pins 78 are projected inward through the frame pivot holes 57 and into the crimped outside hinging edge 74 of the top blade 72. The blade assembly is then secured in position by an enclosing loop formed of the flexible wire 95 which passes through the frame support holes 63, the S-links 96 and the temperature responsive fusible link 97. When subjected to temperatures higher than the design temperature of the fusible link 97, the link melts to thereby break the integrity of the blade assembly encircling loop and allow the blade assembly to unfold due to gravitic action which quickly carries the weighted bottom blade down into the bottom of the frame and thereby closes the cross-section of the damper to air flow therethrough.

While the showings of FIGURES 21 and 22 are directed toward fire damper structures intended for positioning in a vertical plane within a duct structure, and are thereby enabled to utilize the force of gravity to unfold the blade assembly, gravity actuation of the blade assembly is not possible when the damper unit must be positioned so that the blade assembly is in a horizontal plane when opened out to close the cross-section of a vertically running duct. The blade assembly of a horizontally disposed damper structure requires a positive actuation device, one form of such a structure being illustrated in the showings of FIGURES 23 through 27 to which attention should be now directed.

The frame assembly of FIGURES 24 to 27 is substantially the same as that of FIGURES 21 and 22, differing therefrom in that the frame is shown as being of elongated or non-square rectangular form, and further includes the blade assembly actuating and locking devices shown separately in FIGURE 23. The elongation of the frame assembly of FIGURE 24 is shown merely to illustrate the provision of plural frame mounting holes in the elongated sides of the structure. Inasmuch as the frame structure shown in FIGURES 24 through 27 differs in no material respect from the previously described frame structure, the reference characters utilized are the same as those used to denote various elements of the previously described frame structures with the exception that these reference characters are increased by 100. Thus, the frame stock is illustrated as having a central web 141, side margins 142, flanges 143, frame mounting holes 154, tabs 162a and locking corner plates 168.

The blade assembly is also similar to that previously described having a top blade 172 secured by pivot pins 178 and hingedly interfitted with a plurality of blades 191 each of which have an inside hinging edge 194 and an outside hinging edge 193, the entire blade assembly being secured by a flexible wire 195 together with S-links 196 and a fusible link 197. The blade assembly differs from that previously described in FIGURES 17 through 20 in that the bar-weighted bottom blade has been eliminated since it can no longer provide a gravity actuation for a horizontally mounted unit.

Figure 25:
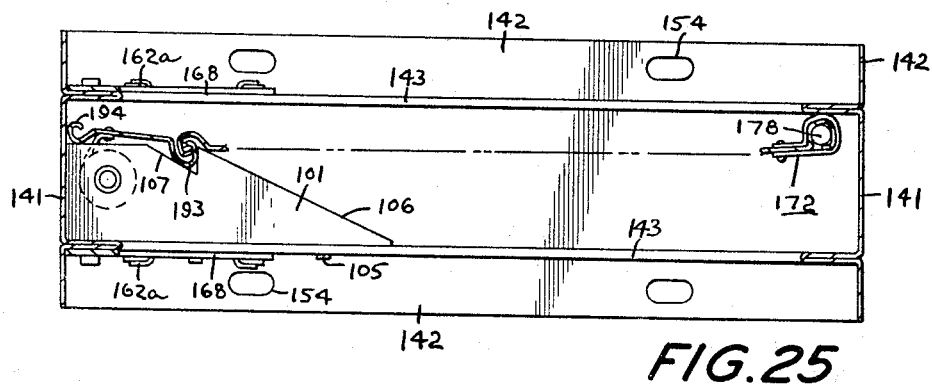
FIGURE 25 is a sectional view taken through the damper structure of FIGURE 24 as would be seen when viewed along the line 25—25 thereof and is shown with the blade assembly opened out to close the cross sectional area of the damper frame.
Figure 27:
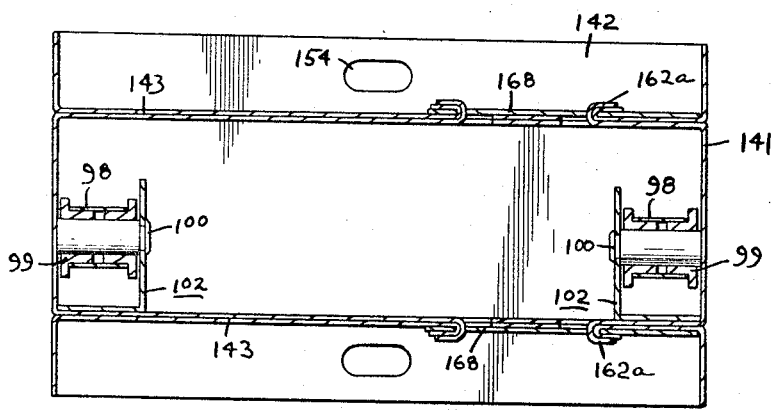
FIGURE 27 is a sectional view through the damper structure of FIGURE 24 as would be seen when viewed along the line 27—27 of FIGURE 26.

In its stead, as best seen in the FIGURES 25 and 26, there has been secured to the bottom blade 191 proximate each end to its inside hinging edge 194 one end of a constant tension spiral spring 98, the opposite end of each spring 98 being secured upon a takeup spool 99 mounted for rotation upon a shaft 100 carried by one leg 101 of a blade lock guide bracket 102. The spring and bracket assembly is shown separately in the showing of FIGURE 23, two such assemblies being utilized in each frame structure as is perhaps best seen from the showings of FIGURES 24 and 27. Each of the brackets 102 is provided with an anchoring leg 103 having rivet holes 104 punched therethrough, these holes being spaced so that they coincide with the positions of holes 66 previously punched through the flanges of the frame structure so that the brackets 102 may be rigidly secured to the frame flanges by rivets 105 as best seen in FIGURE 24.

The horizontal damper assembly of FIGURE 24 is shown in operative position in the sectional view of FIGURE 26 prior to actuation of the unit so that the blade assembly is compacted at the right hand end and the constant tension springs 98 are extended. When now the fusible link 197 melts due to an elevated temperature condition in the duct run so that the cinching wire or cable 195 is released, the springs 98 immediately begin to draw the bottom blade 191 of the assembly toward the left to thereby begin to unfold the reversely folded blade assembly. The leading edge 194 of the bottom blade of the assembly moves to the left until it strikes the upwardly sloping edge 106 of locking leg 101 which guides the blade edge upward therealong and over the upper edge until the trailing edge 193 of the bottom blade of the assembly drops downward into the locking notch 107 cut downward from the upper edge of the leg 101. At this point the leading edge 194 of the bottom blade is in substantial abutment against the frame central web portion 141, all as best seen in FIGURE 25. The opened out blade assembly is thus positively locked into position.

Finally, the modification of FIGURE 28 illustrates a damper assembly of the type already described in connection with the showing of FIGURE 22 but in which the cinch wire 95 has been replaced by a metal strap 295 perforated along its length with a series of equispaced holes 296. The ends of strap 295 are projected downward through the top center mounting holes 54 and the strap is pulled down flatwise against the upper surface of the frame. Below the mounting holes the straps are twisted sharply at right angles to lock the strap and face it edgewise to the air flow through the damper. The fusible link 97 carried by the "S" links 96 may be positioned at any desired elevation by hooking the "S" links into selected strap holes 296 to thereby either compact the blade assembly or partially unfold the blade assembly and block the damper opening to any desired degree. Thus, the air flow through a multiple duct system may be balanced out. The terminal ends of the strap 295 may of course be turned back upward out of the air-stream to minimize air resistance and noise.

Having now described my invention in connection with particularly illustrated embodiments thereof, it will be clear that modifications and variations thereof may now occur from time to time to those persons normally skilled in the art without departing from the essential scope or spirit of my invention, and accordingly it is intended to claim the same broadly as well as specifically as is indicated by the appended claims.

What is claimed as new and useful is:

1. A damper assembly comprising in combination
   (a) a rigid frame including top, bottom and opposite side portions which define a main frame common plane transverse to the air flow path through said frame,
   (b) a blade assembly including a plurality of individual damper blades adjacent ones of which are pivotally interconnected by interfitted hinging elements carried by parallel longitudinally extending blade edges to effect relative rotation between adjacent blades,
   (c) means mounting said blade assembly in said frame,
   (d) means securing the blades of said assembly reversely folded one against another to form a compacted assembly characterized by the disposition of the hinges in planes substantially parallel to the said main frame plane, said blade assembly securing means in its operative condition including adjustable means effective for securing said blade assembly in partially unfolded condition intermediate the fully opened and fully closed positions, whereby, the airflow volume through said damper may be adjusted as desired, and
   (e) means effective to cause said blade assembly to unfold and close the air flow path through said frame by effecting relative rotation between adjacent blades of said assembly when said securing means is rendered inoperative.

2. The damper apparatus as set forth in claim 1 wherein said blade assembly securing means is carried by said frame and includes, an anchoring element extending vertically with respect to and at least partially alongside of said blade assembly and carrying a plurality of vertically spaced detents, and a blade assembly support underlying said blade assembly and including support securing means selectively engageable with a desired one of said anchoring element detents.

3. The damper apparatus as set forth in claim 2 wherein said anchoring element is an elongated strap depending from the upper end of said frame and is perforated at longitudinally spaced intervals along its length, said perforations providing the aforesaid plurality of detents, and wherein said blade assembly support securing means includes a hook element projectable through a selected perforation into detachable holding engagement with the strap.

4. A folded one piece rectangular perimeter damper frame structure of open transverse cross section formed from a unitary piece of frame stock having a longitudinally extending rectangular planar web with side and end edges and from one planar surface of which orthogonally project a pair of spaced apart longitudinally extending parallel rectangular flanges spaced inward from and parallel to said side edges and extending from one end to the other to thereby divided said planar web into a rectangular central web part disposed between said flanges and a pair of rectangular side margins disposed respectively laterally outward of said flanges,
   (a) each said flange being provided with three longitudinally spaced ninety degree V-shaped notches transversely aligned with the notches in the other flange with each such notch extending symmetrically from the flange outer edge convergingly inward to the point where the flange meets the planar web, the opposite ends of said flanges being each provided with a half-notch and said frame being folded through said V-shaped notches transversely to the frame stock length so that the side edges of each notch are in substantial abutment and the frame is closed at a corner joint by abutment of the opposite end half-notches and end edges, said flanges forming therebetween with said central web a substantially continuous peripherally extending channel within said planar web,
   (b) an apertured rigid L-shaped locking plate disposed flatwise against each flange adjacent the ends thereof and bridging the corner closure joint,
   (c) a plurality of locking tabs turned out of said flanges in the region thereof covered by said locking plate, said tabs being projected through the apertures of said apertured locking plate and turned down against said plate to thereby rigidly lock together the opposite ends of said frame structure, and
   (d) means operative to permit mounting of a damper blade assembly within the said channel between said flanges at one end of said frame, said side margins being apertured to provide means for mounting said frame within a rectangular duct.

5. A folded one piece perimeter frame structure of open transverse cross section formed from a unitary piece of frame stock having a longitudinally extending planar web with opposite side and end edges and from one planar surface of which outwardly project a pair of spaced apart longitudinally extending parallel flanges spaced inward from said side edges and extending from end to end between said end edges to thereby divide said planar web into a central web disposed between said flanges and a pair of side margins disposed respectively laterally outward of said flanges, said flanges being provided with a plurality of transversely aligned longitudinally spaced V-shaped notches each extending from the flange outer edges convergingly inward to the point where the flange meets the planar web, said frame being folded through said notches transversely to the frame stock length so that the edges of each notch are in substantial abutment and the frame is closed by abutment of said end edges, said flanges forming a substantially continuous peripherally extending channel within said planar web, and securing means rigidly locking together the opposite ends of said frame structure, means operative to permit mounting of a damper blade assembly within the said channel between said flanges at one end of said frame, a pair of damper blade locking guide brackets fixedly secured to the frame and disposed between the channel forming flanges at one end of and at opposite sides of said frame, each bracket including a blade guide edge sloping upward from the surface of one flange toward the facing surface of the other flange and toward the end of said frame remote from the blade assembly mounting end, said guide edge terminating at the bracket upper edge which latter is spaced away from the facing flange by a distance at least sufficient to permit a blade of the blade assembly to pass edgewise therethrough, and blade engaging locking means carried by said locking guide brackets effective to engage at least one blade of a blade assembly mounted in said frame when such blade assembly is opened out to close the normally open cross section of the damper frame and thereby lock the blade assembly in its damper closing position.

6. A folded one piece perimeter frame structure of open transverse cross section formed from a unitary piece of frame stock having a longitudinally extending planar web with opposite side and end edges and from one planar surface of which outwardly project a pair of spaced apart longitudinally extending parallel flanges spaced inward from said side edges and extending from end to end between said end edges to thereby divide said planar web into a central web disposed between said flanges and a pair of side margins disposed respectively laterally outward of said flanges, said flanges being provided with a plurality of transversely aligned longitudinally spaced V-shaped notches each extending from the flange outer edges convergingly inward to the point where the flange meets the planer web, said frame being folded through said notches transversely to the frame stock length so that the edges of each notch are in substantial abutment and the frame is closed by abutment of said end edges, said flanges forming a substantially continuous peripherally extending channel within said planar web, and securing means rigidly locking together the opposite ends of said frame structure, means operative to permit mounting of a damper blade assembly within the said channel between said flanges at one end of said frame, a pair of damper blade locking guide brackets fixedly secured to the frame and disposed between the channel forming flanges at one end of and at opposite sides of said frame, each bracket including a blade guide edge sloping upward from the surface of one flange toward the facing surface of the other flange and toward the end of said frame remote from the blade assembly mounting end, said guide edge terminating at the bracket upper edge which latter is spaced away from the facing flange by a distance at least sufficient to permit a blade of the blade assembly to pass edgewise therethrough, and blade engaging locking means carried by said locking guide brackets effective to engage at least one blade of a blade assembly mounted in said frame when such blade assembly is opened out to close the normally open cross section of the damper frame and thereby lock the blade assembly in its damper closing position, and blade moving means supported by said frame structure at the locking bracket end thereof and securable to a blade assembly effective to open out an unsecured blade assembly to close the damper frame cross section and render said blade locking means operative.

7. The apparatus as set forth in claim 6 wherein said blade engaging locking means is a notch in said locking bracket extending downward from the said bracket upper edge and into which one edge of the end blade of the blade assembly is disposable, and wherein said blade moving means are constant tension springs wound about rotatable spools carried by said locking brackets and each having one end securable to the end blade of the blade assembly.

8. An elongated piece of material adapted for forming into a unitary frame structure by bending the same transversely at selected points and bringing the opposite ends together for securement, comprising, a unitary piece of frame stock having a longitudinally extending planar web with opposite side and end edges and from one planar surface of which outwardly project a plurality of longitudinally extending flanges arranged in two spaced apart parallel rows each spaced inward from a different one of the side edges of the planar web and extending from one end of the web to the other, the facing ends of the flanges in each row being diagonally cut from their outer edge downward to a point substantially at the surface of the planar web to thereby define V-shaped notches between adjacent flanges of each row, the said notches of one row being transversely aligned with the notches of the other row so that the planar web of the stock may be transversely folded through the notches, and the diagonal cut of each flange which defines the included angle of the formed notch between adjacent flanges of a row being such that when the planar web is folded through said notches so that the diagonally cut flange ends defining each notch are in substantial abutment the opposite ends of the frame stock close to one another at a predetermined desired angle, at least one locking tab turned laterally outward from each of the end flanges in each row of flanges proximate to the outer end of each such flange, said side margins being provided at longitudinally spaced intervals therealong with apertures therethrough suitable for use as mounting holes in a finished frame assembly, and said central web being provided with a pair of apertures therethrough at opposite sides of a pair of adjacent notches so that such aperatures are spaced away from a pair of adjacent corners by the same distance when the frame structure is folded into closed form.

9. A damper assembly comprising in combination
(a) a rigid frame including top, bottom and opposite side portions which define a main frame common plane transverse to the air flow path through said frame,
(b) a blade assembly including a plurality of individual damper blades adjacent ones of which are interconnected by hinging elements carried by parallel longitudinally extending blade edges to effect relative rotation between adjacent blades,
(c) means mounting said blade assembly in said frame,
(d) means securing the blades of said assembly reversely folded one against another to form a compacted assembly characterized by the disposition of the hinges in planes substantially parallel to the said main frame plane,
(e) means effective to cause said blade assembly to unfold and close the air flow path through said frame by effecting relative rotation between adjacent blades of said assembly when said securing means is rendered inoperative, and
(f) blade locking means carried by said damper frame effective to latch at least one blade of said blade assembly when said blade assembly is opened out to close the normally open cross section of the damper frame and thereby lock the blade assembly in its damper closing position, said locking means being disengaged from and out of mechanical contact with said blade assembly except when the latter is opened out to close the air flow path through the damper.

10. A damper assembly as defined in claim 9 further including blade assembly guiding means fixedly secured to and extending substantially the length of said frame between said top and bottom along at least one frame side effective to guide said blades as they unfold lengthwise of said frame, said blade locking means being mechanically connected to and carried by said blade assembly guiding means.

11. A damper assembly as defined in claim 9 further including blade assembly guiding means fixedly secured to and extending substantially the length of said frame between said top and bottom along at least one frame side effective to guide said blades as they unfold lengthwise of said frame, said blade locking means being mechanically connected to and carried by said blade assembly guiding means at a position along the length of the latter effective to latch with the leading blade of said blade assembly when it has traversed the frame plane to close the air flow path therethrough.

12. A damper assembly as defined in claim 9 further including blade assembly guiding means fixedly secured to said frame effective to guide said blades as they unfold lengthwise of said frame, said blade locking means being located at a position effective to latch with the leading blade of said blade assembly when the latter has traversed the frame plane to close the air flow path therethrough.

13. A damper assembly as defined in claim 12 further including auxiliary blade guide means fixedly secured to said frame at the end thereof toward which the blades of said blade assembly move as they unfold, said auxiliary blade guide means including a blade guide edge sloping from a point closer to one open end of said frame toward the frame mid-plane and against which the leading blade of said blade assembly moves and is thereby guided into its final position when said blade assembly is unfolded to close the air flow path through the damper.

14. A damper assembly as defined in claim 13 wherein said blade locking means is a part of said auxiliary blade guide means.

References Cited

UNITED STATES PATENTS

| | | | |
|---|---|---|---|
| 1,775,717 | 9/1930 | Everhard | 160—402 X |
| 2,045,770 | 6/1936 | Golden | 160—381 X |
| 2,049,925 | 8/1936 | Rafter | 287—189.36 X |
| 2,241,266 | 5/1941 | Mayne et al. | 52—658 |
| 2,643,422 | 6/1953 | Gottschalk | 52—475 X |
| 2,869,694 | 1/1959 | Breckheimer | 287—189.36 X |
| 2,952,342 | 9/1960 | Schnittker | 287—189.36 X |
| 3,005,513 | 10/1961 | Larson | 182—228 X |
| 3,273,632 | 9/1966 | McCabe | 160—235 X |

DAVID J. WILLIAMOWSKY, *Primary Examiner.*

HARRISON R. MOSELEY, *Examiner.*

P. M. CAUN, *Assistant Examiner.*